United States Patent [19]

Weidner

[11] 4,218,155
[45] Aug. 19, 1980

[54] STICK FOR APPLYING A LIQUID

[75] Inventor: Richard K. Weidner, Remelfing, France

[73] Assignee: Etablissements Armor, S.A., Paris, France

[21] Appl. No.: 876,941

[22] Filed: Feb. 10, 1978

[51] Int. Cl.² ............................................. A47L 13/17
[52] U.S. Cl. .................... 401/132; 128/269; 222/541; 401/196
[58] Field of Search ............... 401/132, 183, 196, 186, 401/198, 205, 202; 128/260, 261, 269, 267; 206/484, 459, 602, 601, 634, 438, 534, 443, 457, 820, 628, 627, 620, 605, 532, 539; 222/94, 107, 541; 53/559

[56] References Cited

U.S. PATENT DOCUMENTS

| | | | |
|---|---|---|---|
| 2,736,656 | 2/1956 | Marshall | 206/484 X |
| 2,895,606 | 7/1959 | Hoag | 206/469 |
| 3,035,300 | 5/1962 | Wattles | 401/198 |
| 3,094,729 | 6/1963 | Dalton | 206/820 X |
| 3,184,895 | 5/1965 | O'Connor | 53/559 X |
| 3,238,691 | 3/1966 | Miller et al. | 53/559 X |
| 3,278,085 | 10/1966 | Brown | 206/484 X |
| 3,635,567 | 1/1972 | Richardson, Jr. | 401/196 X |
| 3,741,384 | 6/1973 | Cloud | 222/107 X |
| 3,757,782 | 9/1973 | Aiken | 401/132 X |
| 3,826,259 | 7/1974 | Bailey | 128/269 |
| 3,847,151 | 11/1974 | D'Alessandro | 401/198 X |
| 3,862,684 | 1/1975 | Schmitt | 206/438 X |
| 3,876,314 | 4/1975 | Nehring | 128/269 X |
| 3,891,331 | 6/1975 | Avery | 401/132 |
| 3,913,734 | 10/1975 | Siegel | 206/459 X |
| 3,981,304 | 9/1976 | Szpur | 128/269 |
| 3,998,559 | 12/1976 | Hoyt | 401/196 X |
| 4,007,838 | 2/1977 | Awad | 206/484 |
| 4,027,985 | 6/1977 | Loesser | 401/196 X |
| 4,140,409 | 2/1979 | De Vries | 401/196 X |

FOREIGN PATENT DOCUMENTS

| | | | |
|---|---|---|---|
| 2440413 | 4/1975 | Fed. Rep. of Germany | 401/132 |
| 1338948 | 8/1963 | France | 222/541 |
| 1016053 | 1/1966 | United Kingdom | 401/132 |

Primary Examiner—Edgar S. Burr
Assistant Examiner—Steven A. Bratlie

[57] ABSTRACT

A stick for applying liquids has a liquid reservoir formed directly by the housing of the stick. At one end of the stick, the housing forming the wall of the reservoir is easily broken, so that the liquid can flow out. This end of the stick is covered by a piece of absorbent material which soaks up the liquid leaving the reservoir. In use, the soaked absorbent material is rubbed against a surface to which liquid is to be applied.

2 Claims, 3 Drawing Figures

STICK FOR APPLYING A LIQUID

FIELD OF THE INVENTION

This invention relates to a stick which has been especially designed for cleaning, with a liquid, the reading heads of magnetic recorders, magnetic tape unwinding rollers and typewriter type, but which can be used for distributing any liquid substances, and in particular cosmetic products and stain removers.

BACKGROUND OF THE INVENTION

Cleaning sticks are already known which consist of an elongated hollow member in the form of a deformable stick firmly closed at one of its ends. The hollow member houses a closed container which can be broken and which contains a liquid cleaning agent, and an absorbent material covers the other end of the stick-shaped hollow member and projects on the outside of said member. These sticks can be joined together into groups of several sticks which can be manually separated. The hollow stick-shaped member can be formed, for example, by a small deformable plastics tube closed at one of its ends. Said small plastics tube acts as a housing for a glass phial containing the cleaning liquid, which is sealed by fusion. The outlet end of the small plastics tube is closed by a stopper consisting of a compressed absorbent wad.

In order to use this known cleaning stick, one presses it longitudinally against the edge of a table with the wad downwards, so as to break the glass phial. The cleaning liquid which is released by breaking the glass phial impregnates the wad, which is then rubbed over the surface to be cleaned, for example over the type of a typewriter.

These known cleaning sticks suffer from disadvantages in that a relatively large force is required to break the glass phial, and when the glass phial is broken it is always possible for glass splinters to be produced which pass through the small plastics tube and injure the fingers of the user. A further drawback of the known cleaning sticks is that because a wad is used, it is possible during cleaning for fibres from the wad to be caught on the object being cleaned.

Furthermore, the method used for manufacturing the known cleaning sticks, in which phials are filled with the cleaning liquid, the glass phials are sealed by fusion, and are then placed in small previously manufactured plastics tubes, the stick then finally being sealed by a wad-type stopper, is both laborious and costly.

SUMMARY OF THE INVENTION

The object of the present invention is to provide a hollow stick for distributing liquid or pasty substances which on the one hand is more easy to use, more appropriate and less dangerous, and on the other hand is of more simple manufacture than sticks of the prior art.

According to the invention, the hollow stick-shaped member, which can be for example a small plastics tube, is directly used to contain the liquid, said hollow member being hermetically sealed at its two ends, and having a rupture initiation line at its outlet end, said rupture initiation line and the outlet end of the hollow member being surrounded by absorbent material, said hollow stick-shaped member being composed of a material which is inert to the liquid cleaning agent.

The invention also relates to a method for manufacturing strips of several of such hollow sticks, for example five, which are joined together by fillets comprising a rupture or cut-out initiation line, the method comprising the steps of forming elongated cavities, preferably trough-shaped, disposed parallel to each other and side-by-side in a composite sheet of suitable type, designed to become the upper face of the strip; filling said elongated cavities with a liquid substance; fitting on to said upper part a composite sheet, possibly coloured and printed, designed to constitute the lower face of the strip, and joining the two composite sheets by welding or heat sealing along their contact surface; cutting the composite strip thus obtained along its edges to give it the required shape; forming after cutting, or simultaneously therewith, rupture initiation lines for each stick and separation lines for the sticks; disposing a foam of plastics material in the form of a single-piece band, and of a length sufficient to extend over the outlet ends of all the sticks, about said outlet ends and the rupture initiation lines in such a manner that the plastics foam is applied both to the upper part and to to the lower part, then welding said foam to the outlet ends, parallel to the separation lines; and then cutting the band of plastics foam between the outlet ends of the various sticks.

The method of using the cleaning stick according to the invention is certainly simple. A stick, which may have been separated from a strip of sticks along one of the rupture or cut-out lines, is held and the plastics foam situated at its outlet end is pushed obliquely against a hard support (the surface of a table or the like). This pressure causes the rupture initiation line to open, after which the liquid thus released flows into the absorbent material and impregnates it. The stick is then ready for use. In the case of a cleaning stick, that end with the absorbent material is rubbed on the surface to be cleaned. The advantages of the cleaning stick according to the invention are obvious. As the glass phial has been dispensed with, any risk of injury to the user by glass splinters from the broken phial no longer exists. Furthermore, it is much simpler for the user to open a rupture initiation line than to break a glass phial. Again, the cleaning stick according to the invention is more appropriate for the required operation because, if a plastic foam is used as absorbent material, no fibre can remain caught on the object to be cleaned. A further advantage lies in the method for manufacturing the cleaning stick according to the invention, which is considerably simplified, amongst other things, because the need to fill the glass phials and seal them by fusion no longer exists.

Further characteristics and advantages of the invention will be more evident from the description given hereinafter of one embodiment of the invention, with reference to the accompanying drawing.

DETAILED DESCRIPTION OF THE PREFERRED EMBODIMENT

Figure 1:
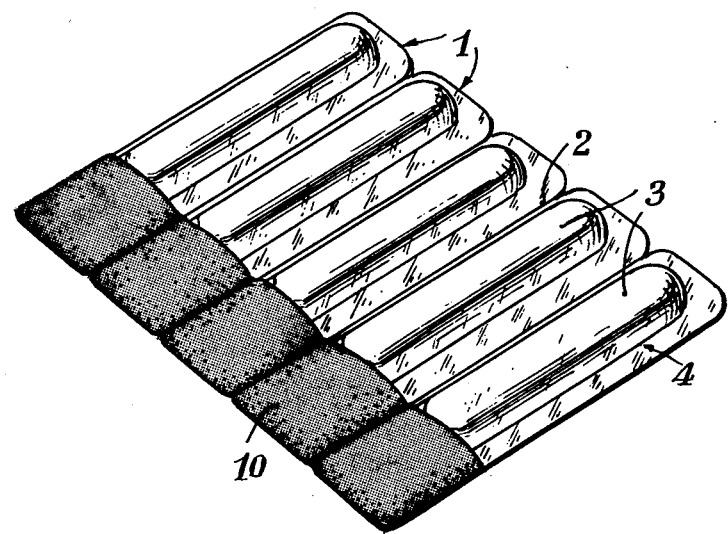
FIG. 1 is a perspective view of a strip of five sticks.
Figure 2:
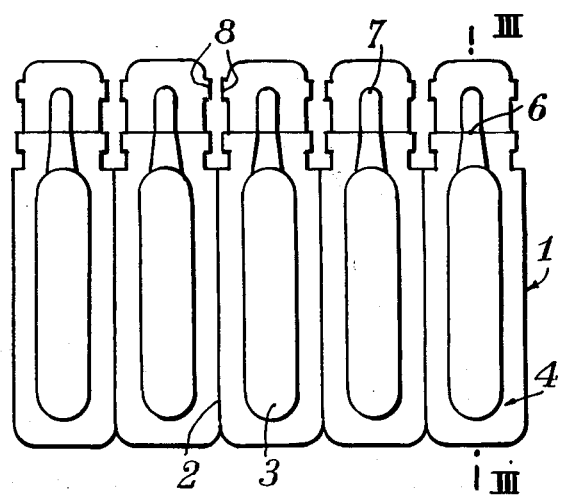
FIG. 2 is a plan view before putting the band of absorbent material in place.
Figure 3:
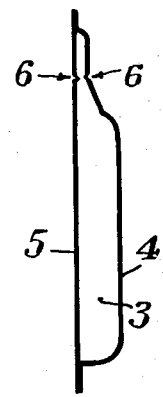
FIG. 3 is a section on the line III—III of FIG. 2.

The five hollow sticks 1 shown in the Figures are joined together by a common part provided with a rupture or cut-out initiation line 2. Each comprises an elongated cavity 3 in its upper face 4, which is fixed in a sealed manner to its lower face 5, which is flat. A further rupture initiation line 6 is provided at the outlet end 7 of said sticks, and preferably in each of its faces. Fixing projections 8 ensure that the band of absorbent material 10 which surrounds the outlet end 7 of said sticks is well fixed.

The upper face 4 and lower face 5 of said strip of five sticks are constructed of a deformable material, preferably a synthetic thermoplastic material, and advantageously of an antistatic type which can be pressed, hot sealed or welded, printed and cut. Polystyrene constitutes one example of such a thermoplastic material which can be used for the application of the invention, but other plastics materials which possess all or some of the desired characteristics can equally be used.

The upper face 4 is advantageously constituted by a transparent composite sheet which, preferably by pressing, is provided with the aforesaid elongated cavities 3, preferably of trough shape. However, this method of formation may be replaced by any other appropriate transformation method. The lower face 5 is preferably constituted by a composite coloured sheet, which is smooth or flat, and which can be coloured with any desired colour. The faces 4 and 5 are joined together by hot sealing or welding along their contact surface. The composite sheets can have, for example, a thickness of about 240 to 300 microns, but it is equally possible to use composite sheets of a smaller or larger thickness.

The type of liquid contained in the elongated cavities 3 is chosen according to the envisaged application. This liquid may consist for example of trichlorethylene or carbon tetrachloride when it is required to clean the type of a typewriter, to remove grease film from a piece of metal or to remove grease spots from fabric. Other types of cleaning agent which can be used are, for example, acetone, isopropyl alcohol, petrol and toluene. However, the plastics material or composite sheet which is used, i.e. of which the faces 4 and 5 are constructed, must be inert to the cleaning liquid contained in the stick, i.e. it must not dissolve or swell in contact with said liquid, nor must it be chemically attacked thereby. Such inertness should advantageously extend over a relatively wide temperature range, preferably between about −45° and about +60° C., and equally over a very long time, preferably about one and a half years. In this respect, according to a further characteristic of the invention, it has been found that for cleaning magnetic tapes and recording and reproduction heads used in information processing, the only substances which can be used as cleaning liquids are Foranes (a commercial trademark indicating a group of fluorinated methane and ethane derivatives manufactured by Ugine, France), in particular Forane 113.

The cleaning stick according to the invention can thus be used with a filling of Forane 113, in particular in the information processing sector.

The absorbent material, preferably constituted by a resilient open-cell plastics foam inert to the cleaning liquid, can be a weldable, cuttable and antistatic polyvinyl chloride foam. Obviously, any other suitable material of cell structure can be used for this application.

The size of the cleaning sticks varies according to the application.

I claim:

1. A package which is manually separable into a plurality of individual cleaning sticks for application of a volatile cleaning liquid to a surface to be cleaned comprising:
   a first thermoplastic sheet having a plurality of spaced parallel elongated troughs formed therein, filled with volatile cleaning liquid, each trough including at one end a reduced cross section dispensing portion;
   a second sheet of thermoplastic material overlying said first sheet on the open side of said troughs and heat sealed thereto to define a plurality of closed liquid filled containers;
   a plurality of cut out portions extending inwardly from one end of said sheets to form openings between each pair of reduced dispensing portions of said troughs, the edges of said cut out portions having protrusions thereon;
   means defining a rupture score line across each of said dispensing portions;
   a plurality of open celled foam plastic applicator members one enclosing each dispensing portion respectively, engaging with said protrusions and welded to said dispensing portions; and
   means defining a score line between each adjacent trough to facilitate separation into individual cleaning sticks.

2. A method of manufacturing strips of cleaning sticks for applying a volatile cleaning liquid to a surface to be cleaned, the sticks being joined together by fillets comprising a rupture separation line, the steps comprising:
   a. forming elongated troughs having a reduced cross section dispensing portion at one end, parallel to each other, side by side and facing in the same direction in a first sheet of thermoplastic material;
   b. filling said troughs with the liquid;
   c. fitting a second sheet on to said first sheet;
   d. joining said sheets by each sealing along their contacting surfaces to form a plurality of sealed liquid filled sticks;
   e. cutting the composite sheet between adjacent dispensing portions to form openings with protrusions on the edges thereof;
   f. forming rupture initiation lines across each dispensing portion and separation lines between each adjacent trough for separating sticks;
   g. disposing open celled plactic foam material in the form of a single piece band and of a length sufficient to extend over all sticks at that end having the dispensing portion so as to contact both said sheets and overlie said rupture initiation lines and welding said foam to said sheets parallel to said separation lines; and
   h. cutting said foam between adjacent dispensing portions.

* * * * *